April 11, 1939.  F. L. CARSWELL ET AL  2,153,789
IRRIGATION AND DRAINAGE TUBE
Filed Nov. 13, 1937   2 Sheets-Sheet 2

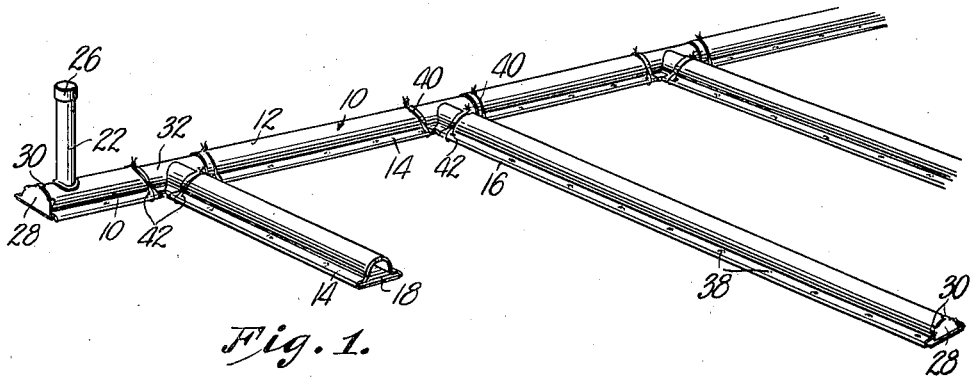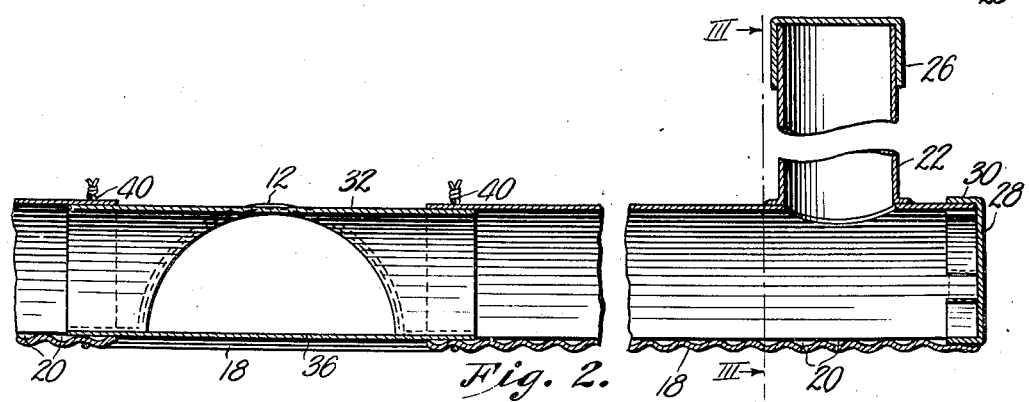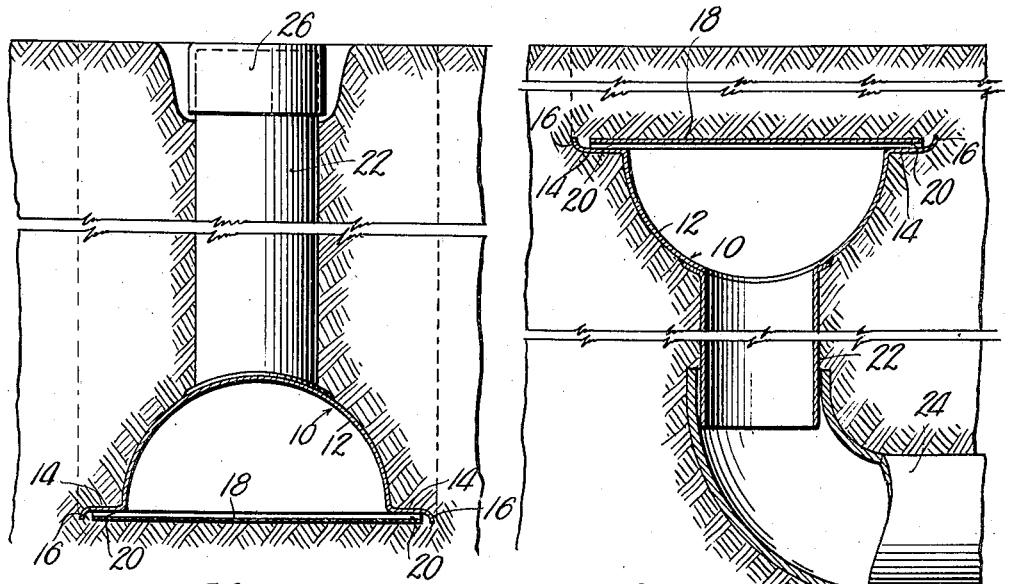

INVENTORS,
Firman L. Carswell
Otto W. Schmidt.
BY Hovey & Hamilton,
ATTORNEYS

Patented Apr. 11, 1939

2,153,789

UNITED STATES PATENT OFFICE 2,153,789

IRRIGATION AND DRAINAGE TUBE

Firman L. Carswell, Johnson County, Kans., and Otto W. Schmidt, Kansas City, Mo.

Application November 13, 1937, Serial No. 174,386

3 Claims. (Cl. 61—13)

This invention relates to a liquid flow system comprising improvements in irrigation and drainage tubes and has for its principal object to provide an irrigation and drainage tube which will maintain a fixed position beneath the surface of the earth being irrigated or drained, and will also distribute the irrigating water uniformly to the soil adjacent the tubes.

A further object of the present invention is the provision of a specially constructed tube suitable for sub-irrigation purposes when in a certain position beneath the surface of the ground and to serve as a drainage tube when inverted from said certain position.

Another object of the present invention is the provision of an irrigation and drainage tube having a transversely flanged channel member and an associated relatively flat transversely corrugated plate, which presents a series of openings at opposite sides of the tube to permit liquid to flow to and from said tube.

Other objects are simplicity and economy of construction, ease of assembly, and adaptability for use in both irrigation and drainage systems without change in the general structure.

In the accompanying drawings which form a part of this invention—

Figure 1 is a perspective view of a system of tubes as used in a sub-irrigation system embodying this invention.

Fig. 2 is an enlarged longitudinal sectional view of a portion of said tubular system.

Fig. 3 is a vertical cross-sectional view taken on line III—III of Fig. 2 with the parts shown in position beneath the surface of the ground.

Fig. 4 is a sectional view of the tubular system showing the tube in the inverted position for the purpose of draining the soil thereabove.

Figure 5:
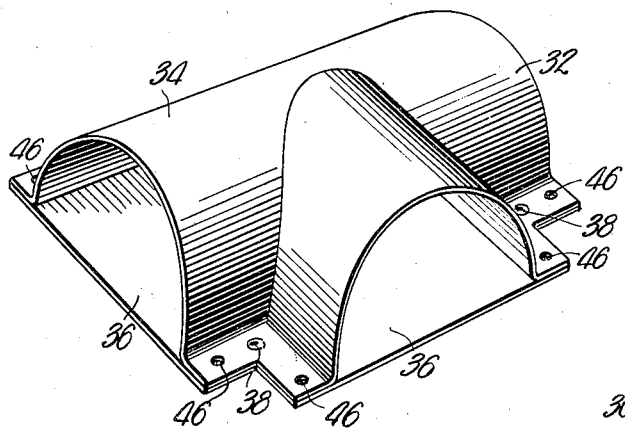
Fig. 5 is a perspective view of the T connection used to connect the laterals to the main feed tube.
Figure 6:
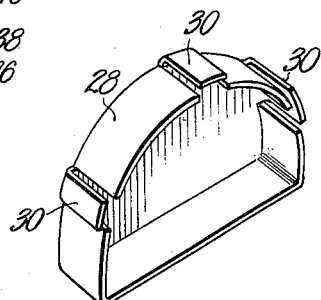
Fig. 6 is a perspective view of an end cap by means of which the free ends of the tubes are closed.

Throughout the several views like reference characters designate similar parts and numeral 10 indicates elongated tubular members comprising a channel member 12, having transverse flanges 14. The channel members shown in the preferred form, are of semi-circular construction, however, it is very apparent that the cross-sectional shape of these members 12 might be varied without interfering with the spirit of the invention.

Each of the flanges 14 is preferably provided at its outer edge, with an outwardly turned lip 16, extending in a direction opposed to the body of the channel member. The open side of the channel is substantially closed by means of an undulated, or transversely corrugated longitudinal plate 18, which is preferably secured to the flanges 14 by spot welding, riveting, or any other suitable means, so as to form a series of small openings 20 at each side of the tube. These openings are made of a suitable size to insure substantially equal distribution of the water throughout the full length of the tube when used for sub-irrigation.

It will be observed that lips 16 extend beyond plate 18 and serve to preclude packing of the earth against the openings 20. While a uniformly corrugated plate 18 is shown, however, this plate might be irregularly undulated so as to provide openings suitable for the water to pass to and from the tube.

Referring now to Fig. 4 wherein the tube is shown in a position to serve as a drainage pipe, it will be noted that the lips 16 of flanges 14 are turned upwardly thereby forming a trough which will direct any water collecting on the outer surface of plate 18, into openings 20 thence into the tube 10. When so positioned, the filler tube 22, which communicates with one of the tubes 10, is disposed in a downwardly position and may be connected with a drainage sewer pipe 24, to carry the accumulated water from the system.

In Fig. 3 wherein the tubular system is shown for sub-irrigation purposes, it will be noted that the filler tube 22 extends to the surface of the ground and is provided with a sealing cap 26. When it is desired to discharge water from the garden hose into the system, this cap 26 is removed and the nozzle of the hose inserted into tube 22.

To prevent excessive loss of water from the ends of the different tubes, a slip-on cap 28 having engaging tongues 30, is adapted to be inserted in the open end of each of said tubes with the tongues 30 positioned on the outside of said tube to limit the inward movement of the cap.

Since it is necessary to join lateral tubes to a general feed tube, a connecting member 32 must be provided. One of these connectors 32 is clearly shown in Fig. 5 and consists of a T for joining a single lateral to a longitudinal tubular pipe. This connector comprises a three way channel member 34, completely closed at its open side by means of an angled plate 36. Channel member 34 and plate 36 are preferably joined together by spot welding as at 38.

Figure 7:
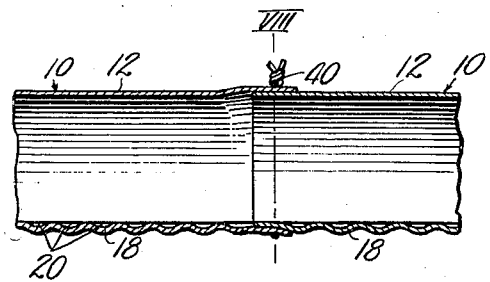
Fig. 7 shows a longitudinal sectional view of two tubes joined together by a lap joint.
Figure 8:
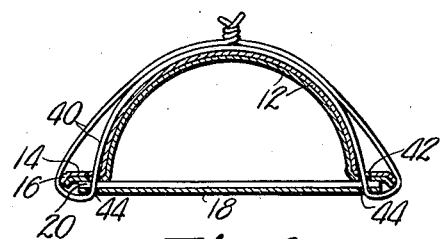
Fig. 8 is a cross-sectional view taken on line VIII—VIII of Fig. 7.

Reference will now be had to the means whereby the tubes are securely fastened to the connecting members and also to each other. This connecting means is best shown in Figs. 7 and 8 and consists in the binding of the two parts together by means of a wire 40 passing through openings 42 and 44, formed through members 12 and 18 respectively. The main body of wire 40 passes over member 12, the ends of which pass through the openings 42 and 44 at opposite sides of the tube, which are then rebent on themselves to meet above said channel member 12 where they are twisted together to tightly draw the members of the tube together. A like joint is provided for the connector 32 wherein the wires are passed through the openings 46 as indicated in Fig. 5.

Should it be desirable to extend laterals in both directions from the main tube, a cross or four-way connector would be used in place of the three-way connector as shown. It is very apparent that the positioning of the pipes in the ground might be varied to meet the shape or inclination of the particular ground plot being irrigated or drained.

Figure 9:
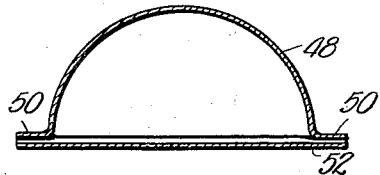
Fig. 9 is a cross-sectional view of a modified form of the tube wherein the outer edges of the transversely corrugated plate are flush with the adjacent flanges of the channel member.

Upon referring to Fig. 9, it will be noted that the semi-circular flanged channel member 48 is provided with transverse flanges 50 which lie in a common plane and are not provided with outwardly turned lips. Furthermore, the plate 52 is of such a width as to extend flush with the outer edges of flanges 50.

Figure 10:
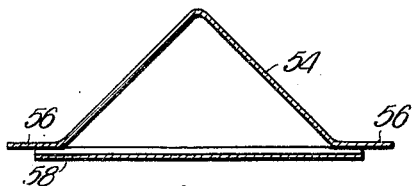
Fig. 10 is also a sectional view of a modified form of the tube showing the channel of V-shape and the base member narrower than the extended flanges of the channel member.

Fig. 10 also shows a modified form of the tube wherein the inverted V-shaped channel 54, provided with transverse flanges 56, is closed at its open side by means of transversely corrugated plate 58 so as to present openings therebetween which terminate intermediate the edges of flanges 56.

It is obvious that when this particular type tube is used for sub-irrigation, the water delivered to the system through filler tube 22, will be fed to the adjacent soil uniformly and no water will be able to collect in said tube because of the substantially planar shape of the transversely corrugated plate.

Having thus described the invention, what is claimed as new and desired to be secured by Letters Patent is:

1. A tubular section comprising a channel member having out-turned longitudinal flanges at its opposite edges, each flange being off-set outwardly throughout its length, a transversely corrugated plate secured along the open side of said channel to said flanges, between said off-set flange portions and in spaced apart relation thereto whereby openings to said tube are formed to permit the flow of liquid to and from said tube.

2. An irrigation system comprising interconnected tube sections, each tube section comprising a channel member having outwardly-turned longitudinal flanges at its opposite edges, the outer edge portion of each flange being off-set outwardly throughout its length; a transversely corrugated plate secured along the open side of said channel, between said off-set flange portions and in spaced relation thereto to present a series of downwardly directed openings at each side of said tube; and caps whereby the free ends of said tubes are closed.

3. A liquid flow system comprising telescoping tube sections, each tube section comprising a channel member having out-turned flanges at its opposite edges, each flange being outwardly off-set throughout its length, an undulated plate secured along the open side of said channel and to said flanges, between said off-set flange portions and in spaced apart relation thereto, whereby openings to said tube are formed, the telescoping portions of said tube sections being perforated at said flanges; and adjustable means passing through said perforations whereby the tubes are securely clamped together.

FIRMAN L. CARSWELL.
OTTO W. SCHMIDT.